United States Patent [19]

Quay et al.

[11] Patent Number: 5,175,230
[45] Date of Patent: Dec. 29, 1992

[54] ALKYL SUBSTITUTED DIFUNCTIONAL CYCLOHEXYLISOCYANATES

[75] Inventors: Jeffrey R. Quay, Kutztown; Jeremiah P. Casey; Kenneth M. Kem, both of Emmaus, all of Pa.

[73] Assignee: Air Products and Chemicals, Inc., Allentown, Pa.

[21] Appl. No.: 859,210

[22] Filed: Mar. 27, 1992

[51] Int. Cl.$^5$ .............................................. C08G 18/75
[52] U.S. Cl. .................................... 528/59; 528/60; 528/61; 528/65; 528/76; 528/77; 528/80; 528/83; 528/85; 560/354
[58] Field of Search ...................... 528/59, 60, 61, 65, 528/76, 77, 80, 83, 85; 560/354

[56] References Cited

U.S. PATENT DOCUMENTS

| 3,180,883 | 4/1965 | Case | 260/453 |
|---|---|---|---|
| 4,879,408 | 11/1989 | Knöfel et al. | 560/330 |
| 4,946,925 | 8/1990 | Strohmayer et al. | 528/122 |

FOREIGN PATENT DOCUMENTS 1080739 10/1967 United Kingdom .

Primary Examiner—Maurice J. Welsh
Attorney, Agent, or Firm—Russell L. Brewer; James C. Simmons; William F. Marsh

[57] ABSTRACT

This invention pertains to alkyl substituted difunctional cyclohexylisocyanates having an isomer distribution. The isocyanates are represented by the formulas:

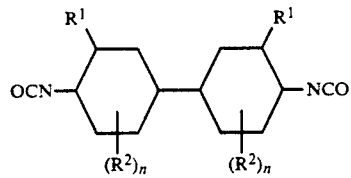

and

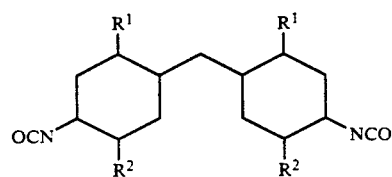

wherein;
$R^1$ is $C_{1-4}$ alkyl; $R^2$ is $C_{1-4}$ alkyl and n is 0 or 2.

The invention also relates to polyurethane and polyurethane/urea resins prepared using the alkyl substituted difunctional cyclohexylisocyanates as at least a portion of the polyisocyanate used in forming the polyurethane.

16 Claims, No Drawings

ALKYL SUBSTITUTED DIFUNCTIONAL CYCLOHEXYLISOCYANATES

TECHNICAL FIELD

This invention pertains to alkyl substituted bridged difunctional cycloaliphatic isocyanates for use in preparing polyurethane resins and to the resulting polyurethane resins.

BACKGROUND OF THE INVENTION

The use of aromatic and aliphatic polyisocyanates for preparing polyurethane systems by reaction with a long chain polyol followed by chain extension through a short chain polyol or short chain polyamine is well known and practiced in the industry. Aliphatic polyisocyanates are known to enhance light stability in polyurethanes; aromatic polyisocyanates tend to cause yellowing over a period of time.

There is substantial art on the subject of aromatic and cycloaliphatic isocyanates for polyurethane synthesis and the following patents are representative of the prior art:

U.S. Pat. No. 3,180,883 shows various organic isocyanates where one or more of the isocyanate groups are hindered or blocked to render it less reactive than another isocyanate group. In these compositions at least one of the isocyanates is blocked; typically both positions ortho to an isocyanate group are blocked. Examples of aromatic polyisocyanates include 3,5-dialkyl-4,4'-diisocyanato diphenylmethane; 4,4'-diisocyanato diphenyl ether; 3,3'-dimethyl-4,4'-diisocyanatobiphenyl and 3,3'- dimethyl-4,4'-diisocyanato diphenyl methane and the like.

U.S. Pat. No. 4,879,408 discloses cycloaliphatic diisocyanates in the form of isomer mixtures represented by the formula:

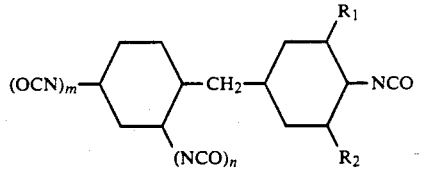

wherein at least one of the isocyanate groups is blocked by an organo group in each of the ortho positions. The patent discloses in the background portion of the specification high melting aliphatic and cycloaliphatic isocyanates such as hexamethylene diisocyanate; 3,5,5-trimethyl-1-isocyanato-3-isocyanatomethylcyclohexane (isophoronediisocyanate) as being useful in preparing light-stable coating materials which are characterized with a high resistance to weathering. Examples of liquid and blocked cycloaliphatic isocyanates include 4,4'-diisocyanato-3-ethyl-5-methyldicyclohexylmethane and 4,4'-diisocyanato-3,5-dimethyldicyclohexylmethane.

British patent 1,080,739 discloses various aromatic isocyanates for use in the manufacture of polyurethane cellulosic systems wherein the isocyanate group is a hindered isocyanate group. Both mononuclear and bridged aromatic isocyanate compositions are disclosed. A methylene radical is the bridging group.

U.S. Pat. No. 4,946,925 discloses various bridged bi(cyclohexylamine) derivatives as curing agents. Each cyclohexylamine group has two alkyl groups where the alkyl groups are in the 2 and the 5 position and the amine groups are in the 4 position. Specific curing agents include 2,2',5,5'-tetramethylmethylenedi(cyclohexylamine). The tetraalkyl substitution pattern in a bridged cyclohexylamine derivative provides for extended pot life by retarding activity of the amine as a curative and the tetraalkyl substitution also enhances thermal properties of the epoxy resin. The isocyanate derivative is not disclosed.

SUMMARY OF THE INVENTION

This invention pertains to a bridged alkyl substituted difunctional cyclohexylisocyanates formed from a precursor amine having an isomer distribution. The alkyl substituted bridged difunctional cyclohexylisocyanates are represented by the formulas:

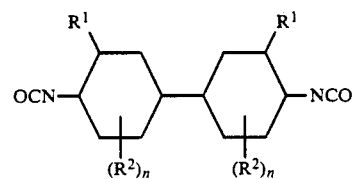

and

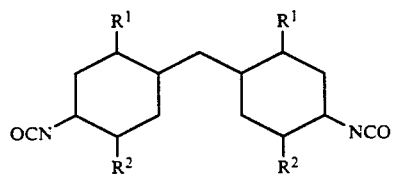

wherein;

$R^1$ is $C_{1-4}$ alkyl; $R^2$ is $C_{1-4}$ alkyl and
n is 0 or 2.

Several advantages are associated with the bridged alkyl difunctional cyclohexylisocyanates of this invention and these advantages include:

1. extended pot life of the polyurethane resin permitting flexibility in formulation;
2. enhanced formulations for coatings and elastomers;
3. enhanced thermal stability of polyurethane resins;
4. enhanced tensile strength at break; and,
5. excellent physical properties for molded products, e.g., elongation, toughness, etc.

DETAILED DESCRIPTION OF THE INVENTION

The present invention relates to diisocyanates corresponding to the general formulas shown above, the process for preparing these diisocyanates mixtures and polyurethanes prepared from those diisocyanates. The diisocyanates are prepared generally by conversion of the corresponding diamine through phosgenation to produce the diisocyanate. Phosgenation of the amine to produce the isocyanate is a conventional route for producing polyisocyanates as for example the process is used for the preparation of polyisocyanates set forth in the background of the invention.

The aromatic diamines typically are the precursor to the isocyanate and in a typical process the aromatic diamines are hydrogenated to produce the cycloaliphatic counterparts via catalytic hydrogenation. Hydrogenation of aromatic amines is a well known process with catalysts suitably comprising ruthenium, rhodium, mixtures thereof at hydrogenation pressures ranging from about 500 to 4,000 psi. Temperatures ranging from 150° to 250° C. are often used in the catalytic hydrogenation process to effect saturation of the aromatic ring.

The alkyl substituted bridged bi(cyclohexylamine) derivatives used for curing polyurethane resins represented by formula I is as follows:

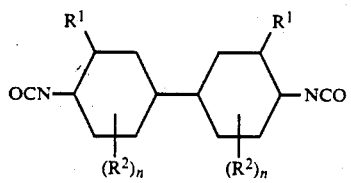

wherein;

$R^1$ is $C_{1-4}$ alkyl; $R^2$ is $C_{1-4}$ alkyl and n is 0 or 2.

The methylene bridged alkyl substituted cyclohexylisocyanates are represented by formula II and it is as follows:

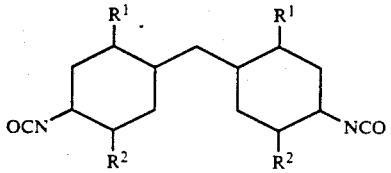

wherein;

$R^1$ is $C_{1-4}$ alkyl and $R^2$ is $C_{1-4}$ alkyl.

The alkyl substituted bridged bi(cyclohexylisocyanates) are formed from the bridged bi(cyclohexylamine) precursors which are typically present as an isomer mixture.

The bridged difunctional cyclohexylamines can be synthesized in conventional manner followed by hydrogenation. Typically a ruthenium catalyst is used to effect hydrogenation and conditions of hydrogenation will range from a hydrogen pressure of from 500 to 4500 psig, temperatures ranging from 150° C. to 250° C. and reaction times may extend from a period of 1 to 24 hours. Monitoring of the hydrogenation process by sampling is the best method of determining when the desired degree of hydrogenation is effected.

Representative examples of the bridged difunctional cyclohexylamines suited for conversion to the corresponding alkyl substituted difunctional cyclohexylisocyanates include 3,3'-dimethylbi(cyclohexylamine); 3,3'-diethylbi(cyclohexylamine); 3,3'-diisopropylbi(cyclohexylamine); 3,3'5,5'-tetramethylbi(cyclohexylamine); and 2,2',5,5'-tetramethylbi(cyclohexylamine) and 2,2',5,5'-tetramethylmethylenedi(cyclohexylamine).

In the preparation of polyurethanes and polyurethane/ureas, a polyisocyanate is reacted with a long chain polyol and chain extended with a short chain diol or a polyamine. In many cases the polyisocyanate is reacted initially with a long chain polyol to form a prepolymer which then is chain extended with the short chain polyol or polyamine. In other types of processes referred to as the "one shot" process, the reactants are mixed and then injected into a mold under high pressure and reacted. Both types of processes are conventional and each may be used.

The polyol used in forming the polyurethane may be a polyalkylene ether, polylactone or polyester polyol including any of those conventionally used in the production of elastomeric polyurethanes. These polyol systems include organic compounds which contain at least two hydroxyl groups and typically have a molecular weight from about 500 to 5000 and preferably a molecular weight from about 1000 to about 3000. Polyester polyols which are linear or slightly branched can be used and are obtained by the reaction of carboxylic acids and mono or polyhydric alcohols which include amino alcohols and diamino alcohols. Examples of polycarboxylic acids used for preparing polyester polyols include oxalic acid, malonic acid, succinic acid, glutaric acid, suberic acid, azelaic acid, maleic acid, fumaric acid and the like as well as hydroxy carboxylic acids. Polyols used in the preparation of the polyester polyols include ethylene glycol, propylene glycol, butylene glycol, pentanediol, hexanediol and heptanediol.

Another class of polyols suited for preparing the polyisocyanate prepolymers include polyether polyols and are derived by condensing an alkylene oxide with an initiator. Initiators generally are difunctional compounds and include glycols such as ethylene glycol, propylene glycol, hexanediol, and the like. Triol and higher functionality polyols can also be used and blended with the difunctional polyols, e.g. up to 20% by weight. Preferred polyols are the polyether polyols such as poly(tetramethylene glycol) and polycaprolactone. The use of higher functional polyols is discretionary with the operator.

The proportion of each reactant typically is controlled so that there is a free isocyanate content of about 2–12% by weight. When more than 12% free isocyanate is present, the prepolymer may be too reactive with the chain extender mix to achieve proper molding. And, if a less reactive amine chain extender is employed, the molding operation may be excessive in terms of time. Normally, for desirable molding operations, the free isocyanate content is from 3–9% by weight.

The chain extender mix used for chain extension of the polyurethane molding composition generally consists of a diamine or short chain polyol. Small amounts of short chain triol or triamine and higher functional polyol and polyamine chain extenders can be included in the chain extender mix such as, for example, up to 10% of the reqired functionality. Ethylene glycol, propylene glycol, butylene glycol, glycerol or higher polyol, e.g. pentaerythritol, can be used.

The following examples are intended to illustrate various embodiments of the invention and are not intended to restrict the scope thereof.

EXAMPLE 1

Preparation of 3,3'-Dimethylbi(cyclohexylamine) (DMBCHA) Using Ruthenium Catalyst ortho-Tolidine, 212.3 g (1.0 mole Fluka anhydrous) dissolved in 637 ml tetrahydrofuran (THF) was placed in a 2 liter autoclave. 8.49 g of a commercially available 5% Ru on alumina catalyst was added followed by addition of 2.1 g anhydrous lithium hydroxide base promoter. The reactor was sealed, purged three times with nitrogen, then twice with hydrogen before being pressurized with hydrogen, to 1500 psi. The reaction mixture was brought to 165°–180° C. while maintaining 750 rpm sealed stirrer agitation. The contents of the reactor then was held at that temperature to effect reduction. At reaction temperature the reactor pressure was brought to 1900 psi and allowed to drop to no lower than 1500 psi before being recharged to 2500 psi. When slightly greater than stoichiometric hydrogen consumption had occurred (89 min), the reaction mixture was cooled, vented, and purged with nitrogen. The crude reaction solution was removed from the autoclave, filtered free of catalyst, and analyzed by capillary chromatography. Product DMBCHA isomers comprised 95.5% of the reaction crudes and were analyzed by capillary flame ionization detection. Deaminates were 4.5%.

EXAMPLE 2

Preparation of 3,3'-Dimethylbi(cyclohexylamine) (DMBCHA) Using Rhodium on Alumina Catalyst The procedure of Example 1 was essentially repeated except that an alternative catalyst was used. In this example 212.3 g (1.0 moles) ortho-tolidine was dissolved in 637 ml THF and placed in the autoclave. 8.49 g of commercially available 5% Rh on alumina catalyst and 2.3 g anhydrous LiOH were added. The reactor was purged thrice with nitrogen, thrice with hydrogen, then vented to atmospheric pressure. The reactor then was pressurized with hydrogen to 1500 psi and The stirred reaction mass was brought to 165°–180° C. Reactor pressure was maintained between 2290 and 1500 psi as hydrogen uptake rate was monitored. When slightly greater than stoichiometric hydrogen uptake was reached (60 min), the reactor was cooled, vented and purged. Crude DMBCHA product was 90.2%. Deaminates were 8.7% and single ring reduced coproduct 1.1%.

EXAMPLE 3

Preparation of 3,3'-Dimethylbi(cyclohexylamine) (DMBCHA) Using Rhodium on Titania Catalyst The procedure of Example 1 was followed except that a Rh on titania catalyst was used for ortho-tolidine hydrogenation after in-situ catalyst reduction. More specifically, 3.03 g of a 5% Rh on titania catalyst from Engelhard and 750 ml THF were charged to a 2 L autoclave equipped with an in-line 5 micron frit cartridge filter on an external port. The reactor was purged thrice with nitrogen, thrice with hydrogen, then vented to atmospheric pressure before hydrogen pressurization to 1000 psi. The stirred reaction mass was brought to 200° C. reaction temperature. Reactor pressure was maintained between 1000 and 900 psi for 3 hours before cooldown. The reactor was pressurized to 50 psi with nitrogen and the solvent filtered from the catalyst. The catalyst was backflushed with 637 ml THF that was then removed under pressure, and the reactor was charged with 212.3 g ortho-tolidine in 637 ml THF. No alkali promoter was used. Ring reduction after nitrogen and hydrogen purging was accomplished in 86 minutes at 165°–180° C. and 2260–1500 psi. Deaminates were 7.9%; half reduced coproduct was 4.2%. Although no alkali promoter was used, the amount of reduced coproduct was only slightly higher than was achieved with the alkali promoted rhodium on aluminum catalyst in Example 2.

EXAMPLE 4

Preparation of 3,3'-Dimethylbi(cyclohexylamine) (DMBCHA) Using Ruthenium on Titania Catalyst Reduction of ortho-tolidine was effected using 5% Ru on titania; 106 g aromatic diamine was dissolved in 530 ml THF (5:1 vol:wt versus 3:1 vol:wt as in prior examples) and charged to the 2 liter autoclave with 4.25 g catalyst. The reactor was purged thrice with nitrogen, thrice with hydrogen, then vented to atmospheric pressure before hydrogen pressurization to 2000 psi. The reaction was complete in 120 minutes at 2700–2000 psi hydrogen pressure and 170°–185° C. There was complete ring reduction; desired product was 96.8%, deaminates were 3.2% when measured by capillary gas chromatography. As can be learned from Example 3, ruthenium is not as effective as rhodium for effecting the initial hydrogenation.

EXAMPLE 5

Confirmation of Isomer Peaks

The hydrogenation products generated in Examples 1–4 were analyzed and found to have multiple resolved peaks by extended elution profile capillary chromatography. These peaks were confirmed as DMBCHA by mass spectrometry. Isomer distribution varied only slightly as a function of run conditions such as catalyst, temperature, promoter addition and hydrogen pressure at the point of reaction completion. For Examples 1–4 the 8 major resolved isomer peaks, normalized amidst others to 100% DMBCHA composition, varied as given below:

| Isomer peak | pk 1 | pk 2 | pk 3 | pk 4 | pk 5 | pk 6 | pk 7 | pk 8 |
|---|---|---|---|---|---|---|---|---|
| Run 1 - Ru/Al | 3.2 | 3.0 | nr | 17.7* | 37.2 | 23.0 | 5.6 | 8.6 |
| Run 2 - Rh/Al | 1.1 | 1.0 | 3.4 | 5.0 | 23.9 | 41.3 | 5.4 | 15.9 |
| Run 3 - Rh/Ti | 1.0 | .9 | 3.0 | 4.1 | 25.0 | 33.7 | 8.3 | 19.1 |
| Run 4 - Ru/Ti | 1.7 | 1.6 | nr | 10.1* | 40.5 | 29.9 | 5.4 | 9.1 | nr indicates not resolved.
*indicates summed integration with prior non-resolved peak.

EXAMPLE 6

Hydrogenation of TMMDA to TMMDCHA 2,2',5,5'-Tetramethylmethylenedianiline (TMMDA), 254 g (1 mole), slurried in 765 ml tetrahydrofuran was placed in a 2 liter autoclave. 10.2 g of a commercially available 5% Ru on alumina catalyst was added followed by 2.5 g anhydrous lithium hydroxide base promoter. The reactor was sealed, purged three times with nitrogen, then twice with hydrogen before being pressurized a final time with hydrogen, to 2100 psi. The reaction mixture was brought to and maintained at 180° C. with 750 rpm sealed stirrer agitation and held at that temperature during the reduction. Reactor pressure was allowed to drop to no lower than 1500 psi before being recharged to 2000 psi until slightly greater than stoichiometric hydrogen consumption had occurred (6.3 hours). The reaction mixture was cooled, vented, and purged with nitrogen. The crude reaction solution was removed from the autoclave, filtered free of catalyst, and analyzed by capillary chromatography. Product diamine isomers of 2,2'5,5'-tetramethylmethylenedi(cyclohexylamine) (TMMDCHA) comprised 83.1% of the reaction crudes with deaminate lights 4.1%, half-reduced TMMDA 9.0% and unreduced TMMDA 0.4%.

EXAMPLE 7

Hydrogenation of TMMDA to TMMDCHA

The procedure of Example 7 was repeated except that an alternative catalyst was used. The procedure was as follows. 381.6 g (1.5 moles) 2,2'5,5'-tetramethyl-methylenedianiline (TMMDA) was slurried in 500 ml THF and placed in the autoclave. 21.3 g of a commercially available 5% Ru on alumina, 5.4 g of a commercially available 5% Rh on alumina and 2.7 anhydrous LiOH were added. The reactor was purged thrice with nitrogen, thrice with hydrogen, then vented to atmospheric pressure before addition of 102 g anhydrous ammonia charged from a pressurized cylinder. Hydrogen pressurization to 3000 psi was accomplished and the reaction mass brought to 180° C. Reactor pressure was maintained between 3000 and 2750 psi as hydrogen uptake rate was monitored. As slightly greater than stoichiometric hydrogen uptake was reached (5 hours) the reactor was cooled, vented and purged. Crude TMMDCHA product was 85%, lights 2.8%, half-reduced product 11.9% and unreduced TMMDA 0.1%.

EXAMPLE 8

Preparation of 3,3'-dimethylbi(cyclohexylisocyanate)(DMBCHI)

DMBCHA from ortho-tolidine reduction as produced in accordance with the general procedures of Examples 1-4 was phosgenated. Into a 3 liter Morton flask equipped with an air stirrer, cooling bath, thermometer, dry ice condenser and a gas inlet tube was placed 800 g toluene which was cooled to −8° C. The 90 g of phosgene was added below −4° C. Then 80 g DMBCHA plus 4 g dimethylformamide (DMF) in 500 ml of toluene was added from a dropping funnel in one hour at −7° C. to −3° C. with nitrogen passing through the dropping funnel. After 20 minutes at that temperature the mixture was brought to room temperature, allowed to stir overnight, then heated for 6 hours at reflux at which time little HCl gas continued to evolve. The contents were filtered through Celite 545, the solvent evaporated under vacuum and the product (∼100 g) slurried with 600 ml of a 20% methylene chloride/80% petroleum ether solvent mixture and suction filtered through 230-400 mesh silica gel which was then rinsed with solvent. The solvent was removed, the urea-free product filtered through Celite and then fractionally distilled.

Product taken through redistillation at 150 μm Hg pressure was collected at 175°-179° C. and was comprised of a mixture of at least 12 isomers by GC/MS with the major peaks as follows:

| Isomer peak | pk 1 | pk 2 | pk 3 | pk 4 | pk 5 | pk 6 | pk 7 | pk 8 |
|---|---|---|---|---|---|---|---|---|
| DMBCHI | 29.9 | 5.4 | 35.3 | 4.1 | 1.6 | 17.4 | 1.2 | 3.6 |

EXAMPLE 9

Phosgenation of TMMDCHA to TMMDCHI

Into a 5 liter morton flask equipped with an air stirrer, cooling bath, thermometer, dry ice condenser and a gas inlet tube was placed 2000 g toluene which was cooled to −8° C. Phosgene (169 g) was added below −4° C. Then 175 g 2,2'5,5'-TMMDCHA from Example 7 plus 17.5 g pyridine in 1200 ml of toluene was added from a dropping funnel over 70 minutes at −10° C. to −5° C. with nitrogen passing through the dropping funnel. Over 1.5 hours the mixture was brought to room temperature, then warmed to 50° C. and allowed to stir 1.5 hours. After overnight stirring without supplemental heating, the reaction mixture was heated to 70° C. over 3 hours, then heated at 90° C. for 3 hours at which time little HCl gas continued to evolve. The contents were filtered through Celite, the solvent evaporated under vacuum and the tan oil product (∼155 g) slurried with 600 ml of a 20% methylene chloride/80% petroleum ether solvent mixture and suction filtered through 230-400 mesh silica gel which was then rinsed with solvent. The solvent was removed, the urea-free product filtered through Celite and then fractionally distilled.

Product taken through redistillation at 150 μm Hg pressure was collected at 188°-197° C. and was comprised of a mixture of at least 11 isomers by GC/MS with the major peaks as follows:

| Isomer peak | pk 1 | pk 2 | pk 3 | pk 4 | pk 5 | pk 6 | pk 7 | pk 8 | pk 9 | pk 10 | pk 11 |
|---|---|---|---|---|---|---|---|---|---|---|---|
| TMMDCHI | 3.4 | 5.2 | 4.4 | 2.4 | 15.1 | 13.4 | 9.6 | 16.6 | 19.0 | 5.2 | 5.6 |

EXAMPLE 10

Preparation of Prepolymer Using DMBCHI

To 100 g DMBCHI (g wt 138.2) from Example 8 in a three neck 1 L round bottom flask equipped with stirrer and thermowell at 80° C. 179.0 g 1000 mw polytetramethylene glycol, hydroxyl #113.7, equivalent weight 493.4 was slowly added over two hours. Heating and stirring at 100° C. was continued until replicate measured NCO values (5.49%) approximated that calculated (5.46%) for the desired prepolymer.

EXAMPLE 11

Preparation of Prepolymers Using TMMDCHI

To 117.7 g TMMDCHI (eq wt 159.3) from Example 7 in a three neck 1 L round bottom flask equipped with stirrer and thermowell at 80° C., a 182.3 g portion of 1000 mw polytetramethylene glycol, hydroxyl #113.7, equivalent weight 493.4 was slowly added over two hours. Heating and stirring at 100° C. was continued for 13 hours until sequential measured NCO values (5.17%, 5.13%) approximated that calculated (5.15%) for the desired prepolymer.

EXAMPLE 13

Testing of Polyurethanes and Properties thereof

To demonstrate the suitability of the alkyl substituted difunctional cycloaliphatic isocyanates, the corresponding alkyl substituted difunctional cyclohexylisocyanates were first transformed into prepolymers using 1000 mw PTMEG as in Examples 10 and 11, and then cured with diols. Elastomer castings were made at 1.05 —NCO to —OH index using DABCO T-12 dibutyl tin dilaurate catalysis. A representative preparation was 85.7 g TMMDCHI, 4.15 g 1,4-butynediol and 0.171 g of a 5% solution of dibutyl tin dilaurate in 1,4-butanediol. The 1.05 index took into account the diol used as solvent for the catalyst. The liquid components were mixed, degassed, placed in an elastomer mold and cured for 20 hours at 80° C.

Prior to determing the suitability of the alkyl substituted difunctional isocyanates for polyurethanes, cast elastomer physical properties were first determined for a family of diols used to cure a prepolymer made from methylenedi(cyclohexylisocyanate) (MDCHI Desmodur W) and PTMEG. The results comparing the family of diols are shown in Table 1 below.

TABLE 1

| MDCHI (isocyanate) | | | | | | |
|---|---|---|---|---|---|---|
| Physical Property | 1,4-BUTANE DIOL | DIOL | | | | 1,4-BUTYNE DIOL |
| | | HQEE | CHDM | HMTD | DIONOL | |
| SHORE A | 83 | 78 | 69 | 68 | 68 | 88 |
| TENSILE (psi) | | | | | | |
| 100% | 660 | 600 | 200 | 240 | 240 | 980 |
| 200% | 990 | 930 | 250 | 330 | 300 | 1220 |
| 300% | 1210 | 1250 | 290 | 420 | 380 | 1380 |
| @ break | 1500 | 1660 | 1430 | 1540 | 840 | 2340 |
| ELONGATION (%) | 580 | 410 | 810 | 620 | 500 | 610 |
| DIE C TEAR (pli) | 380 | 320 | 120 | 140 | 130 | 500 |

HQEE refers to hydroxyquinonehydroxyethylether.
CHDM refers to cyclohexanedimethanol.
HMTD refers to hydroxytetrahydrodicyclopentadiene.
DIONOL refers to dihydroxyethylbisphenol A Properties for elastomers made from 1000 mw PTMEG prepolymers of DMBCHI, DMMDCHI (b.p. 179°-187° C.@175 μm Hg made by phosgenation of commercial DMMDCHA (Laromin C-260) and TMMDCHI were then determined using the 1,4-butynediol chain extender, which was considered to be the best of the chain extenders tested. They are listed in Table 2 below.

TABLE 2

| | DIISOCYANATE | | | |
|---|---|---|---|---|
| Physical Property | DMBCHI | DMMDCHI | TMMDCHI | MDCHI |
| SHORE A | 70 | 67 | 87 | 88 |
| TENSILE (psi) | | | | |
| 100% | 230 | 240 | 640 | 980 |
| 200% | 310 | 300 | 910 | 1220 |
| 300% | 390 | 390 | 1290 | 1380 |
| @ break | 1470 | 1310 | 2730 | 2340 |
| ELONGATION (%) | 730 | 710 | 490 | 610 |
| DIE C | 140 | 130 | 310 | 500 |

TABLE 2-continued

| | DIISOCYANATE | | | |
|---|---|---|---|---|
| Physical Property | DMBCHI | DMMDCHI | TMMDCHI | MDCHI |
| TEAR (pli) | | | | |

DMBCHI refers to dimethylbi(cyclohexylisocyanate) of the type synthesized in Example 8.
DMMDCHI refers to 3,3'-dimethylmethylenedi(cyclohexylisocyanate).
TMMDCHI refers to 2,2'5,5'tetramethylmethylenedi(cyclohexylisocyanate), Example 9.
MDCHI refers to methylenedi(cyclohexylisocyanate).

What is claimed is:

1. An isocyanate selected from the group consisting of bridged bi(cyclohexylisocyanates) and methylene bridged di(isocyanates) represented by the formulas:

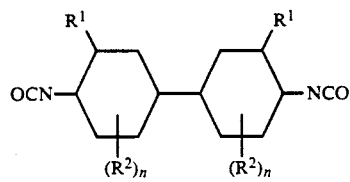

and

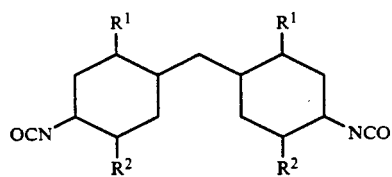

wherein;
$R^1$ is $C_{1-4}$ alkyl; $R^2$ is $C_{1-4}$ alkyl and
n is 0 or 2.

2. The isocyanate of claim 1 represented by formula I wherein each n is 0.

3. The isocyanate of claim 2 wherein at least one $R^1$ group is methyl.

4. The isocyanate of claim 3 wherein both of the $R^1$ groups are methyl groups.

5. The isocyanate of claim 1 represented by Formula I wherein both of the $R^1$ groups are methyl, each n is 1 and the $R^2$ groups are in the 3 and 3' positions.

6. The isocyanate of claim 5 wherein both of the $R^2$ groups are isopropyl.

7. The isocyanate of claim 5 wherein both of the $R^2$ groups are ethyl.

8. The isocyanate of claim 1 wherein both of the $R^1$ groups are ethyl and n is 0.

9. The isocyanate of claim 1 wherein said isocyanate is represented by Formula II and both of the $R^1$ groups and both of the $R^2$ groups are methyl.

10. In a polyurethane resin comprising the reaction product of a polyisocyanate, a long chain polyol, and a chain extender, the improvement which comprises using an isocyanate as defined by claim 1.

11. The polyurethane resin of claim 10 wherein the isocyanate is represented by Formula 1.

12. The polyurethane resin of claim 11 wherein at least one $R^1$ group is methyl.

13. The polyurethane resin of claim 10 wherein both of the $R^1$ groups are methyl.

14. The polyurethane resin of claim 13 wherein each n is 0.

15. The polyurethane resin of claim 10 wherein the isocyanate is represented by Formula II.

16. The polyurethane resin of claim 15 wherein both of the $R^1$ groups and both of the $R^2$ groups are methyl.

* * * * *